(12) United States Patent
Lachowicz et al.

(10) Patent No.: US 8,119,740 B2
(45) Date of Patent: Feb. 21, 2012

(54) CURABLE LIQUID ACRYLOYL GROUP CONTAINING RESIN COMPOSITION

(75) Inventors: Artur Lachowicz, Berlin (DE); Kai-Uwe Gaudl, Hohen Neuendorf (DE); Steven H. Nahm, West Milford, NJ (US); Gerwald F. Grahe, Berlin (DE)

(73) Assignee: Sun Chemical Corporation, Parsippany, NJ (US)

( * ) Notice: Subject to any disclaimer, the term of this patent is extended or adjusted under 35 U.S.C. 154(b) by 764 days.

(21) Appl. No.: 10/539,048

(22) PCT Filed: Dec. 19, 2003

(86) PCT No.: PCT/JP03/16383
§ 371 (c)(1), (2), (4) Date: Feb. 3, 2006

(87) PCT Pub. No.: WO2004/056897
PCT Pub. Date: Jul. 8, 2004

(65) Prior Publication Data
US 2006/0148924 A1 Jul. 6, 2006

(30) Foreign Application Priority Data
Dec. 20, 2002 (EP) .................................... 02028724

(51) Int. Cl.
*C08F 261/10* (2006.01)

(52) U.S. Cl. ........ 525/300; 252/600; 427/457; 427/496; 427/508; 427/522; 522/114; 525/330.3; 525/301; 525/302; 525/303; 525/308; 525/309; 525/310; 525/328.6; 525/471; 525/539; 526/316; 526/319; 526/321; 526/328; 526/329; 528/392

(58) Field of Classification Search ................ 525/330.3, 525/300, 301, 302, 308, 309, 310, 328.6, 525/471; 526/316, 319, 321, 328, 329
See application file for complete search history.

(56) References Cited

U.S. PATENT DOCUMENTS

| 3,016,297 | A | | 1/1962 | Mochel et al. | |
|---|---|---|---|---|---|
| 4,035,320 | A | | 7/1977 | Lawson | |
| 5,539,017 | A | * | 7/1996 | Rheinberger et al. | 523/116 |
| 5,945,489 | A | * | 8/1999 | Moy et al. | 525/471 |
| 6,025,410 | A | | 2/2000 | Moy et al. | |
| 6,706,414 | B1 | * | 3/2004 | Dammann et al. | 428/524 |
| 2002/0007009 | A1 | * | 1/2002 | Stark et al. | 524/806 |

FOREIGN PATENT DOCUMENTS
WO WO 01/00684 A1 1/2001

OTHER PUBLICATIONS

R.J. Clemens, et al.; "A Comparison of Catalysts for Crosslinking Acetoacetylated Resins via the Michael Reaction;" *Journal of Coatings Technology*; vol. 51; No. 770; Mar. 1989; pp. 83-91.

* cited by examiner

*Primary Examiner* — Vasu Jagannathan
*Assistant Examiner* — Robert C Boyle
(74) *Attorney, Agent, or Firm* — McKenna Long & Aldridge, LLP.

(57) ABSTRACT

The invention describes curable liquid acryloyl group containing compositions, which are produced by reacting monofunctional vinyl compounds and multifunctional acrylic esters with β-dicarbonyl group containing compounds having two activated hydrogen atoms in its methylene position. These material can be polymerized or crosslinked by free radical polymerization, UV (ultraviolet) or electron-beam radiation. The curable liquid compositions are suitable for producing curable coatings, printing inks, adhesives, or molding compositions.

32 Claims, No Drawings

CURABLE LIQUID ACRYLOYL GROUP CONTAINING RESIN COMPOSITION

TECHNICAL FIELD

The invention describes a curable liquid composition containing an acryloyl group contained resin produced by reacting monofunctional vinyl compounds and multifunctional acrylic esters with β-dicarbonyl group containing compound in which the two activated hydrogen atoms in its methylene position. These materials can be polymerized or crosslinked by free radical polymerization by heating, UV (ultraviolet) radiation, or electron beam.

BACKGROUND ART

Curable resin compositions, containing acryloyl group contained resin are widely used in the coating industry, for example as coating materials for paper, wood, metal and plastic, in printing inks, adhesives and sealants. Polymerization or crosslinking of acryloyl group contained resin compositions, also termed hereinafter as hardening or curing, is achieved by polymerization of acryloyl group containing, resins in the curable compositions in presence of radical initiators. Such initiators can be activated by UV (ultraviolet) irradiation or heat. Another option is the polymerization initiated by electron beam. In general, commercial production of resins, which contain acryloyl groups, is performed by esterification of oligomeric or polymeric multifunctional alcohols with an excess of acrylic acid. Such a process is described for example in comprehensive literature such as "Prepolymers and Reactive Diluents for UV- and EB-curable Formulations", P. K. T. Oldring (Ed.), SITA Technologies, London, UK, 1991, page 124, 131. Despite widely used, this process is not entirely free of problems.

Acrylic acid is, as a rule, rather unstable at elevated reaction temperatures and carries the risk of spontaneous uncontrolled polymerization, if not properly inhibited.

The purification of acryloyl group containing resins from excess of acrylic acid and acidic catalyst is another problem, aggravated by high viscosity of the products. In the U.S. Pat. Nos. 5,945,489, 6,025,410 and WO specification 0100684, the inventors explain an appropriate route to make acryloyl group, which comes of acrylic ester, containing curable liquid compositions, which are prepared by Michael addition of β-dicarbonyl group containing compounds, e.g., acetoacetates and excess of multifunctional acrylate compounds. The use of acrylates, which are commercially available commodity products, such as trimethylolpropane triacrylate, the short reaction time, the low reaction temperature and the avoidance of acrylic acid and purification steps make this process particularly attractive as an alternative method to produce a curable liquid composition comprising a reactive acryloyl group contained resin.

However, the limitation of this process is that a very large excess of multifunctional acrylate compounds has to be used to avoid gellation during preparation and to provide liquid products having a useful viscosity. The excess of multifunctional acrylate compounds cannot be separated from the composition and remains as a reactive diluent. Therefore, most of the properties attributed to the final cured coating will be based on the cured properties of those multifunctional acrylate compounds. This is a limiting drawback, restricting product versatility and variety of product properties.

Moreover, use of large amounts of expensive multifunctional acrylate compounds also adversely affects raw material cost benefits in the mass production of such acrylated liquid compositions, as only low amounts of inexpensive β-dicarbonyl group containing (e.g., acetoacetylated) resins can be included.

DISCLOSURE OF INVENTION

The primary objective of this invention is to obtain curable liquid compositions containing an acryloyl group contained resin, prepared with a lower excess of multifunctional acrylate compounds and an increased amount of β-dicarbonyl group containing compounds, compared to the prior art, in order to achieve both technical and economic improvement.

Additional objectives of this invention are to provide a method to introduce functional groups (other than acryloyl groups) as well as acryloyl groups into oligomers and polymers containing reactive acryloyl groups.

According to a first aspect, the invention relates to a liquid type acryloyl group containing resin composition obtained by reacting
  (a) at least one monofunctional vinyl compound, and
  (b) at least one multifunctional acrylic ester, with
  (c) at least one β-dicarbonyl group containing compound or resin, in which the β-dicarbonyl group has two activated hydrogen atoms in its methylene position,
  wherein the equivalent ratio of the vinyl group of the monofunctional vinyl compound (a) to the activated hydrogen atom of the compound or resin (c) is in the range from 0.01:1 to 0.9:1 and
  the equivalent ratio of all unsaturated groups from both monofunctional vinyl compound (a) and multifunctional acrylic esters (b) to the activated hydrogen atom of the compound or resin(c) is >1.05:1.

This invention also provides a process for the preparation of the acryloyl group containing curable liquid resin composition, comprising the steps of (1) reacting
  (a) at least one monofunctional vinyl compound, and
  (b) at least one multifunctional acrylic ester with
  (c) at least one β-dicarbonyl group containing compound or resin, in which the β-dicarbonyl group has two activated hydrogen atoms in its methylene position,
  such that the equivalent ratio of the vinyl group of the monofunctional vinyl compound (a) to the activated hydrogen atom of the compound or resin (c) is in the range from 0.01:1 to 0.9:1 and
  the equivalent ratio of all unsaturated groups from both the monofunctional vinyl compound (a) and the multifunctional acrylic ester (b) to the activated hydrogen atom of the compound or resin (c) is >1.05:1.

This invention also provides a process for the preparation of the acryloyl group containing curable liquid resin composition as claimed in claim 1, comprising the steps of
(1) reacting
  (a) at least one monofunctional vinyl compound, with
  (c) at least one β-dicarbonyl group containing compound or resin, in which the β-dicarbonyl group has two activated hydrogen atoms in its methylene position,
  to yield a mono-substituted β-dicarbonyl group containing compound or resin in which the β-dicarbonyl group has only one activated hydrogen atoms in its methylene position, and
(2) reacting said mono-substituted compound or resin with
  (b) multifunctional acrylic ester.

This invention also provides a curing method, comprising the step of curing a liquid type composition mentioned above by UV (ultraviolet) light or electron beam or heat.

This invention also provides a cured product obtained by the curing method mentioned above.

The term monofunctional vinyl compound (a) denotes that such a compound contains only one vinyl group. The vinyl group can be a part of an acryloyl group or part of a group other than acrylate. The term multifunctional acrylic ester (multifunctional acrylate) denotes that such a compound contains at least two acryloyl groups.

The term "equivalent ratio" describes the ratio of unsaturated groups (vinyl groups or acryloyl groups) to activated hydrogen atom (CH-acidic function) in the methylene position of β-dicarbonyl groups.

It should be noted that each unsubstituted β-dicarbonyl group carries two activated hydrogen atoms (CH-acidic functions) in the methylene position. Thus, for example, a mixture containing 2.5 mole methyl vinyl ketone, 1.5 mole dipropyleneglycol diacrylate and 2 mole acetylacetone shows the equivalent ratio of vinyl groups to activated hydrogen atoms of 5.5:4.

In the liquid acryloyl group containing resin composition of this invention, we are able to reduce the weight percent of multifunctional acrylate compounds to 37-54% by weight without gellation or crosslinking, whereas multifunctional acrylate weight percent of the prior art—for the comparable functionality of reactants—is between 75% by weight and 90% by weight. The introduction of a higher weight percent of β-dicarbonyl group containing compound or resin means that the product properties are influenced less by the multifunctional acrylate compounds. Moreover, higher molar ratios and more activated hydrogen atom equivalents of the β-dicarbonyl group containing compound or resin to the acryloyl group can be employed compared to prior art.

In the course of the experiments, it turned out unexpectedly that the acryloyl group containing resin compositions of this invention, which contain lower total number of acryloyl groups cure as well or better than a control product, prepared without the use of monofunctional vinyl compounds (see table 5 and explanation thereinafter). Another technical advantage of the compositions of this invention, including monofunctional vinyl compounds is that adhesion to substrates can be improved (see table 6 and explanation thereinafter). Apart from the technical advantage, economic benefits are also anticipated for the production of acryloyl group containing products. The introduction of large amounts of low cost materials such as alkyd resins and rosin esters into acrylated systems has been the objective of several inventions for example in U.S. Pat. No. 4,035,320 or in WO specification 87/0448. Our examples 16-31 show, that, large amounts of low cost polyester polyols can be transformed into acryloyl group containing polymers by reaction of multifunctional acrylates with previously prepared products of monofunctional vinyl compounds and acetoacetylated polymers.

This is a new method for the introduction of reactive acrylic functions into polymers and an additional objective of this invention. This method enables use of large amounts of inexpensive oligomeric and polymeric materials for the production of economic reactive acrylated materials.

BEST MODE FOR CARRYING OUT THE INVENTION

The principle of the chemical reactions occurring during the formation of the composition of this invention is exemplarily depicted below for a polymer bound multifunctional acetoacetate, a monofunctional vinyl compound and a multifunctional acrylate.

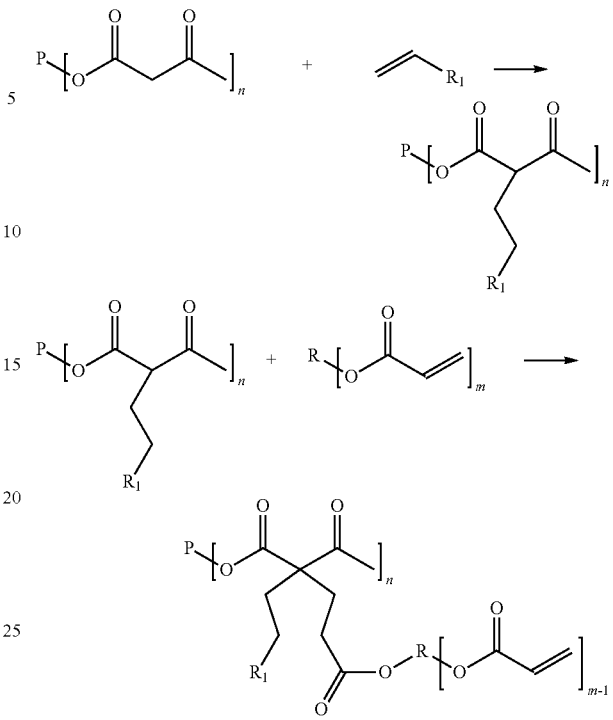

In this reaction formula, P denotes a non reactive oligomer or polymer, R denotes a polyvalent alkylene group, and $R_1$ denotes an organic group other than vinyl group or acryloyl group, such as an alkyl, an alkyl carbonyl, carbonyl, cyano, amido, or non reactive oligomer or polymer.

The monofunctional vinyl compound(s) (a), are such vinyl compounds that are Michael acceptors, or in other words, such vinyl compounds that are able to react with the β-dicarbonyl group containing compound or resin(c) in a Michael reaction as for example, acroleine, acrylonitrile, methyl vinyl ketone, vinyl sulfonate, acrylamide, methyl acrylate, ethyl acrylate, propyl acrylate, butyl acrylate, tert.-butyl acrylate, hexyl acrylate, 2-ethylhexyl acrylate, n-octyl acrylate, nonyl acrylate, decyl acrylate, stearyl acrylate, isobornyl acrylate, adamantyl acrylate, phenyl acrylate, benzyl acrylate, naphtyl acrylate.

Suitable multifunctional acrylates, which denote di- or higher functional acrylates, are for example 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol A diglycidyl ether diacrylate, ethoxylated bisphenol A diglycidyl ether diacrylate, polyethylene glycol diacrylate, trimethylolpropane triacrylate, ethoxylated trimethylol propane triacrylate, propoxylated trimethylolpropane triacrylate, propoxylated glycerol triacrylate, tris(2-acryloyloxyethyl)isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate, dipentaerythritol hexaacrylate, acryloyl group containing oligomers and polymers obtained by reacting polyepoxides with acrylic acid (epoxyacrylates) or obtained by reacting polyester polyols with acrylic acid and/or monomeric alkyl acrylates (polyester acrylates).

Particularly suitable are monomeric difunctional or trifunctional acrylates, such as for example tripropylene glycol diacrylate, trimethylolpropane triacrylate and bisphenol A diglycidyl ether diacrylate.

The β-dicarbonyl group containing compound or resin(c) is characterized in that the compound or resin has β-dicarbonyl group having two activated hydrogen atoms in its methylene position, such as β-diketones or β-ketoesters or malonic acid esters. Here, the compound or resin may have plural the β-dicarbonyl groups. In such cases, the β-dicarbonyl groups have two active atoms bonded to each α-carbon atoms of the β-dicarbonyl groups.

Examples of the compound include; pentane-2,4-dione, hexane-2,4-dione, heptane-2,4-dione, 1-methoxy-2,4-pentanedione, 1-phenyl-1,3-butanedione, 1,3-diphenyl-1,3-propanedione, 4,6-dioxoheptanoic acid methyl ester, 5,7-dioxooctanoic acid methyl ester, benzoylacetic acid methyl ester, benzoylacetic acid ethyl ester, benzoylacetic acid butyl ester, propionylacetic acid ethyl ester, propionylacetic acid butyl ester, butyrylacetic acid methyl ester, acetoacetic acid methyl ester, acetoacetic acid ethyl ester, acetoacetic acid isopropyl ester, acetoacetic acid butyl ester, acetoacetic acid tert.-butyl ester, acetoacetic acid-(2-methoxyethyl) ester, acetoacetic acid-(2-ethylhexyl)ester, acetoacetic acid lauryl ester, 2-acetoacetoxyethyl acrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, ethoxylated bisphenol A diacetoacetate, trimethylolpropane triacetoacetate, glycerol triacetoacetate, pentaerythritol triacetoacetate, pentaerythritol tetraacetoacetate, ditrimethylolpropane tetraacetoacetate, dipentaerythritol hexaacetoacetate, methyl acetoacetamide, ethyl acetoacetamide, dimethyl malonate, diethyl malonate, dibutylmalonate, dihexyl malonate.

Among these compound, suitable are compounds having acetyl group as a constituent of β-dicarbonyl group form the viewpoint of self-curing without any additional photoinitiators.

Examples of the resin include; acetoacetate group containing oligomers and polymers obtained by transesterification of acetoacetic acid alkyl esters with oligomeric or polymeric alcohols, or by reaction of diketene with oligomeric or polymeric alcohols, and the acetoacetate group containing oligomers and polymers obtained by copolymerisation of 2-acetoacetoxyethyl (meth)acrylate, malonate group containing oligomers and polymers obtained by transesterification of dialkylmalonates with di- or trifunctional alcohols.

Particularly suitable are oligomeric and polymeric diacetoacetates, produced by transesterification of polyester alcohols with alkyl acetoacetates or by reaction with diketene. Some multifunctional acetoacetates are commercially available or they can be prepared as described in the prior art as for example in the U.S. Pat. No. 3,016,297 column 18, example X (the contents of which are hereby incorporated by reference). In general, a catalyst is required to accelerate the reaction (Michael addition) between monofunctional vinyl compounds, the multifunctional acrylates and β-dicarbonyl group containing compound or resin.

Catalysts, for the Michael addition, are known from the prior art and include salts from the group comprising ammonium fluorides such as for example benzyltrimethylammonium fluoride, benzyltriethylammonium fluoride, benzyltributylammonium fluoride, tetramethylammonium fluoride, tetraethylammonium fluoride and tetrabutylammonium fluoride, compounds from the group comprising ammonium hydroxides and ammonium methoxides, such as for example benzyltrimethylammonium hydroxide (Triton B), benzyltriethylammonium hydroxide, benzyltributylammonium hydroxide, tetramethylammonium hydroxide, tetraethylammonium hydroxide, tetrabutylammonium hydroxide, benzyltrimethylammonium methoxide and benzyltrimethylammonium methoxide, organic amines with a pK >11, such as for example piperidine, 1,4-dihydroxypyrimidine, 2-phenylbenzimidazole, 2-hydroxypyridine, diazabicyclooctane, diazabicyclononene, diazabicycloundecene and tetramethylguanidine, inorganic bases such as for example sodium carbonate, potassium carbonate, calcium carbonate, calcium hydroxide, lithium hydroxide, sodium hydroxide, potassium hydroxide, sodium phosphate, potassium phosphate, sodium hydride, lithium diisopropylamide and sodium amide, organic metal salts based on alcohols and phenols such as for example sodium methylate, potassium methylate, sodium ethylate, potassium ethylate, magnesium ethanolate, sodium tert.-butylate, potassium tert.-butylate, sodium phenolate and potassium phenolate, metallic sodium, metallic potassium, alkyl magnesium halogenides, butyl lithium, tertiary organic phosphines such as for example triethylphosphine, tripropylphosphine, triisopropylphosphine, trivinylphosphine, tributylphosphine, triisobutylphosphine, tri-tert.-butylphosphine, triallylphosphine, tris(2,4,4-trimethylpentyl)phosphine, tricyclopentylphosphine, tricyclohexylphosphine, cyclohexyldiphenylphosphine, icyclohexylphenylphosphine, triphenylphosphine, tri-n-octylphosphine, tri-n-dodecylphosphine, tribenzylphosphine, dimethylphenylphosphine, 1,2-bis(diphenylphosphino)ethane, 1,3-bis(diphenylphosphino)propane, 1,4-bis(diphenyl-phosphino)butane.

Particularly suitable catalysts for the production of the products according to the invention are tetrabutylammonium fluoride, benzyltrimethylammonium fluoride, benzyltrimethylammonium hydroxide, tetrabutylammonium hydroxide, tetramethylguanidine (TMG), diazabicycloundecene (DBU), sodium tert.-butylate, tri-n-octylphosphine (TOP) and potassium hydroxide.

From the viewpoint of handling, safety and environmental properties (e.g., a low vapor pressure), tri-n-octylphosphine (TOP) and tri-n-dodecylphosphine are particularly preferable among these catalysts.

The aforementioned catalysts may also be used in the form of a mixture of several catalysts.

The preparation of liquid type acryloyl group containing resin compositions according to this invention is carried out by reacting (a) monofunctional vinyl compound, and (b) multifunctional acrylic acid esters with (c) The β-dicarbonyl group containing compound or resin, which the β-dicarbonyl group has two activated hydrogen atoms in its methylene position in the presence of the afore described catalysts.

The amount of catalyst added is 0.3-5.0% by weight referred to the total reaction mixture, and preferably 0.7-2.5% by weight. The reaction proceeds already at room temperature. However, in order to accelerate the process, higher temperatures in the range of 60°-140° C. may be applied, preferably 80°-110° C.

It is possible to execute a reaction of the monofunctional vinyl compound (a), and the multifunctional acrylic acid esters (b) with the β-dicarbonyl group containing compound or resin (c) at once when the compound (a) react with the compound or resin(c) much faster than the multifunctional acrylic acid esters (b) or the molar amount of the monofunctional vinyl compound (a) is fully small compared to the molar amount of the multifunctional acrylic acid esters (b).

However, in the preferred embodiment, the monofunctional vinyl compounds are reacted in a first step with the β-dicarbonyl group containing compound or resin (c), having an excess of activated hydrogen atoms (C—H-acidic functions) compared to vinyl functions.

Namely, a process for the preparation of the curable liquid acryloyl group containing resin composition as claimed in claim 1, comprising the steps of (1) reacting (a) at least one monofunctional vinyl compound, with (c) at least one β-dicarbonyl group containing compound or resin, in which the β-dicarbonyl group has two activated hydrogen atoms in its methylene position, to yield a mono-substituted β-dicarbonyl group containing compound or resin, in which the mono-substituted β-dicarbonyl group has only one activated hydrogen atom in its methylene position, and (2) reacting said mono-substituted β-dicarbonyl group containing compound or resin with (b) multifunctional acrylic ester is preferable.

In order to provide complete reaction, vinyl group equivalents should be less than the activated hydrogen atom equivalents of the β-dicarbonyl group containing compound or resin (c) in the step (1). In other words, the activated hydrogen atom equivalents of the β-dicarbonyl group containing compound or resin (c) must be in excess in order to give the mono-substituted β-dicarbonyl group containing compound. Here, the mono-substituted β-dicarbonyl group containing compound means a reaction product of the monofunctional vinyl compound (a) with β-dicarbonyl group containing compound or resin(c), wherein the product is caused by mono-substitution of the one or plural β-dicarbonyl group(s) in the compound or resin(c) with the monofunctional vinyl compound (a). Therefore, the mono-substituted group containing compound has at least one β-dicarbonyl group(s) having only one activated hydrogen atom in the methylene position.

As for the equivalent ratio of the vinyl group of the monofunctional vinyl compound (a) to the activated hydrogen atom of the compound or resin (c), the range from 0.01:1 to 0.9:1 is preferable in the step (1). Particularly, Preferred among the range is 0.01:1 to 0.8:1.

If full conversion of the monofunctional vinyl compound is desired, the progress of the reaction can be checked by gas chromatography before addition of the multifunctional acrylate compound (b). Moreover, size exclusion chromatography shows by increased molecular weight, compared to the starting material, that the monofunctional vinyl compound (a) has become part of the β-dicarbonyl group containing compound or resin. Furthermore, carbon-13 nuclear magnetic resonance spectroscopy is able to confirm, that the monofunctional vinyl compound (a) is attached to the methylene group between the two carbonyl groups in the compound or resin(c), as new signals, occur typically between 50 and 70 ppm. Here, Methylene group of the β-dicarbonyl group containing compound or resin(c), mono-substituted by the monofunctional vinyl compound (a) is indicated by arrows in the following figure. The methylene carbon shows Chemical shift a=50-70 ppm (13-C NMR).

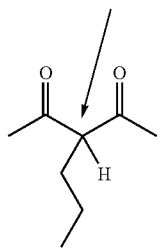

These new signals can be assigned to monosubstituted β-dicarbonyl groups by the "attached proton test" (APT).

As soon as it has been confirmed that the monofunctional vinyl compound (a) have completely reacted, the multifunctional acrylate compound (b) is added and reacts with the remaining activated hydrogen atoms (C—H acidic functions) of the β-dicarbonyl group containing compound or resin in the step (2).

In this step (2), it is preferred that the equivalent ratio of vinyl group of the multifunctional acrylic ester (b) to the activated hydrogen atom of the mono-substituted β-dicarbonyl group containing compound or resin is >1.05:5.

During the reaction in the step (2), the reaction mixture is degassed with air. In the case of polymerization sensitive vinyl compounds or acrylates, polymerization inhibitors may also be added in an amount of 0.01 to 0.5% by weight in order to prevent a premature polymerization of vinyl groups or acryloyl groups during the production. Suitable polymerization inhibitors are for example 4-methoxyphenol and hydroquinone. The reaction time is governed by the character as well as the amount of catalyst and reaction temperature and is defined by the point in time after which the viscosity of the acryloyl group containing resin composition no longer rises and remains constant. The reaction may also be monitored by titration. The titration of the acetoacetate groups is possible with sodium methoxide in pyridine. (Organic Functional Group Analysis, F. E. Critchfield (Ed.) Pergamon Press, Oxford 1963, page 29). The β-dicarbonyl group containing resin is dissolved in freshly distilled pyridine and titrated with 0.1 N sodium methoxide solution in methanol against thymolphthalein. The final product may also be characterized by titration of the acrylate equivalents of the acrylated group containing compositions of this invention by the morpholine method (Organic Functional Group Analysis, F. E. Critchfield (Ed.) Pergamon Press, Oxford 1963, page 116). The acryloyl groups are reacted with. an excess of the secondary amine morpholine. Then, the remaining excess of free morpholine is quenched by acetylation by acetic anhydride. Finally, the tertiary amine, which was formed by the reaction of acryloyl group and morpholine, is titrated with perchloric acid.

The curable liquid acryloyl group containing resin composition which is prepared and characterized according to the aforementioned procedures exhibit several advantages over the prior art. In U.S. Pat. No. 6,025,410 for example, the inventors use large amounts of excess of multifunctional acrylates (column 8-11, tables 2-4) in order to obtain liquid compositions and to avoid gellation. The weight percentage of the multifunctional acrylate compounds is usually very high, for example between 75 and 90% of the total weight, for mixtures having a functionality ratio=2:4 or higher. In example 10-15 of this invention, we show that the weight percentage of the acrylate compounds can be reduced to 37-54% by weight without gellation or crosslinking. As a further result, higher molar ratios and more activated hydrogen atom equivalents of the β-dicarbonyl group containing compound or resin(c) can be employed compared to prior art. For example, in the claim 1 of U.S. Pat. No. 6,025,410, it is taught that for a system having an acrylate acceptor functionality of 2 and a β-dicarbonyl donor functionality of 4, the equivalent ratio (C=C group:C—H group) must be equal or greater 4.5:1. In our examples 4 and 5 (table 2, column 9), we show, that for an acrylate acceptor functionality of 2 (dipropylene glycol diacrylate) and a β-dicarbonyl donor functionality of 4, our equivalent ratio of is 2.95 and 3.66. These values show that the approach of this invention allows liquid products to be made at lower molar C=C group excess than the prior art and to include more of the β-dicarbonyl group containing compound or resin(c) by weight as well as by equivalents. The introduction of more weight percent of β-dicarbonyl group containing compound or resin(c) results in product properties that are much less governed by the acrylate compounds. Moreover, by mono substitution of the disfunctional β-dicarbonyl groups of the compound or resin(c) with the monofunctional vinyl compound (a), any functionality is possible in contrast to the prior art, where only an even functionality (2, 4, 6, 8, etc.) of the β-dicarbonyl group containing compounds is disclosed. All those merits described aforementioned provide an increased variety of products and product properties compared to the prior art. The curable liquid acryloyl group containing resin composition of this invention is colorless or slightly yellowish liquid, showing viscosities of 1000-100000 mPas at 25° C. The molecular weight of the resin in our composition, the weight number averages Mn, are in the range of 500-15000.

An additional objective of this invention is the introduction of functional groups other than vinyl group into curable liquid acryloyl group containing resin, such as an acryloyl group containing oligomer and a acryloyl group containing polymer, in the composition. This is achieved by reaction of functionalized monofunctional vinyl compound as a monofunctional vinyl compound (a) and multifunctional acrylic ester (b) with the β-dicarbonyl group containing compound or resin(c) having two activated hydrogen atoms in its methylene position.

The term functionalized monofunctional vinyl compound denotes that a vinyl compound having one vinyl group, contains at least one more functional group other than the vinyl group. A functional group is also defined as a group having atoms other than carbon and hydrogen. Such a functional group is supposed to impart a additional properties into a reactive polymer or oligomer.

The introduction of the functional groups into polymerizable or crosslinkable systems have been the objective of many inventions. In general, functional groups shall impart new or special properties into a reactive polymer or oligomer such as adhesion, controlled surface tension, crosslinkable groups, hydrophobicity, increased glass transition temperature, slip etc. One older method is to add functionalized acrylate monomers to acrylated resins. During the curing or hardening process acryloyl, groups of the functionalized acrylate monomers and acrylated resins fuse, and the functional groups are fixed to the polymer. However, the drawback of this method is, that in general, especially under UV irradiation, a part of the functionalized acrylate monomers is not polymerized and remains as free monomers in the coating. This may cause problems such as migration of the unreacted monomers to the surface, yellowing and reduced polymer functionality.

On the contrary, with our concept we are able to introduce functional groups into reactive polymers, without the risk of residual functionalized monomers in the composition, as we can prove by analytical methods, that the functionalized vinyl compounds have completely reacted.

The concept of this invention to introduce functional groups into acryloyl group containing oligomers and polymers is exemplarily depicted below for a polymer bound multifunctional acetoacetate, a functionalized monofunctional vinyl compound, having an additional functional group Rf, and a multifunctional acrylate.

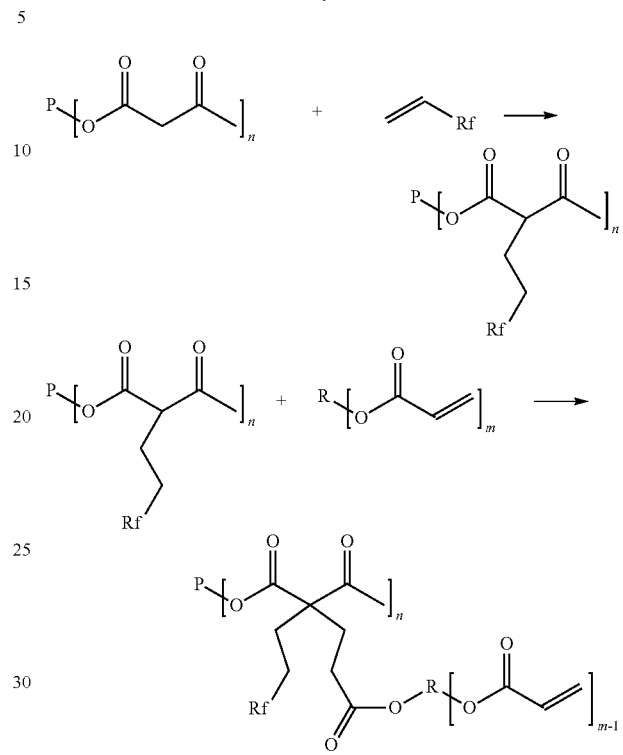

In this reaction formula, P denotes a oligomer or polymer, R denotes a polyvalent alkylene group, and Rf denotes functional group.

Functionalized monofunctional vinyl compounds are available in a large variety. Suitable compounds for this invention are such vinyl monomers which are able to react in a Michael addition with β-dicarbonyl group containing compound or resin(c). Such materials comprise for example functionalized acrylates such as 2-hydroxyethyl acrylate, 2-hydroxypropyl acrylate, 2-hydroxybutyl acrylate, 3-hydroxybutyl acrylate, 4-hydroxybutyl acrylate, 6-hydroxyhexyl acrylate, N-alkoxymethyl acrylamide, N-acryloyl morpholine, glycidyl acrylate, 2-isocyanatoethyl acrylate, poly(ethyleneglycol)monoacrylate, poly (ethyleneglycol)alkylether monoacrylate as for example butoxyethoxyethyl acrylate, perfluoroalkyl acrylates as for example perfluorooctyl acrylate, alkoxy siloxane-functional acrylates, such as poly(dimethylsiloxane)monoacrylate, acrylamide, functionalized acrylamides such as diacetone acrylamide, N-hydroxymethyl acrylamide, etherified N-hydroxymethyl acrylamides, such as butoxymethyl acrylamide, acrylonitrile, acroleine, methyl vinyl ketone and vinyl sulfonate.

The conditions to react functionalized monofunctional vinyl compounds with β-dicarbonyl group containing compound or resin(c) are the same as for non-functionalized monofunctional vinyl compounds and were described previously.

Usually, in order to provide complete reaction, vinyl group equivalents should be less than the activated hydrogen atom equivalents of the compound or resin (c) in the step (1). In other words, the activated hydrogen atom equivalents of the compound or resin (c) must be in excess. As for the equivalent ratio of the vinyl groups of the functionalized monofunctional vinyl compound to the activated hydrogen atom of the compound or resin (c), the range from 0.01:1 to 0.9:1 is preferable in the step (1). Particularly, Preferred among the range is 0.01:1 to 0.8:1.

The reaction progress can be monitored by analytical methods, especially gas chromatography, infrared spectroscopy or size exclusion chromatography to confirm that the vinyl monomers have completely reacted, before the multifunctional acrylates react with the remaining activated hydrogen atoms of the compound or resin (c). Also as described previously, it is also possible to add the functionalized monofunctional vinyl compounds and multifunctional acrylates at the same time.

The curable liquid acryloyl group containing resin composition produced according to the described methods is suitable for producing hardenable or curable coatings, printing inks, adhesives, sheets and moulding compositions.

The resin composition of this invention may be cured by means of heat or preferred by UV (ultraviolet) radiation or electron beam. In general, the composition of this invention may be cured under UV-light without additional photoinitiator when the acryloyl group containing oligomer or polymer in this composition has acetyl group as a constituent of β-dicarbonyl group. For special performance a photoinitiator may be added. Examples of suitable photoinitiators include benzoin and its derivatives, for example, benzoin ethers, such as isobutyl benzoin ether and benzyl ketals, such as benzyl dimethyl ketal, 2-hydroxy-2-methyl-1-phenylpropan-1-one and 4-(2-hydroxyethoxy)phenyl-2-hydroxy-2-propyl ketone. Others include acyl phosphine oxides, such as 2,4,6-trimethylbenzoyl diphenylphosphine oxide. Aryl ketones can also be used, such as 1-hydroxycyclohexyl phenyl ketone, 2-benzyl-2-dimethylamino-1-(4-morpholinophenyl)-butan-1-one, 2,2-dimethoxy-2-phenylacetophenone, mixtures of benzophenone and 1-hydroxycyclohexyl phenyl ketone, perfluorinated diphenyl titanocene, and 2-methyl-1-(4-(methylthiophenyl)-2-(4-morpholinyl))-1-propanone. Hydrogen abstraction free radical type photoinitiators can be used in combination with the above or alone such as Michler's ketone (4,4'-bisdimethylamino benzophenone), Michler's ethyl ketone (4,4'-bisdiethylamino benzophenone ethyl ketone), benzophenone, thioxanthone, anthraquinone, ketocoumarine, anthracene, or derivatives thereof, and the like. The amount of initiators present typically ranges between 0.1 and 10% by weight, with 1 to 5% by weight preferred.

As light source, UV bulbs are available in several designs. Microwave exited electrode-less bulbs are preferred. The Fusion "H" bulb is a typical UV source consisting primarily of an electrical discharge in medium pressure mercury vapor. It is also often considered as the industrial standard. The Fusion "D" bulb also contains a small amount of a metal halide. The "Fusion V-bulb" is similar to the "D" bulb but emits a larger fraction at longer wavelengths. For the curing of the products of this invention, the "H" bulb is the preferred choice.

In general, products having higher acryloyl group equivalents should show, an increased crosslink density after cure. High crosslinking density often causes higher solvent resistance and coating hardness. Surprisingly, this behavior was not observed in the products of this invention. Although the acrylate equivalents in the compositions of this invention were much smaller than in the control composition (table 1, column 3), no difference in cured properties between the coatings of this invention and in the control coating, which is made without monofunctional vinyl compounds, was detected. A high level of solvent resistance and hardness in the cured coatings was maintained. Another important technical advantage of the compositions of this invention, by incorporation of the monofunctional vinyl compound (a), is that adhesion to metallic substrates can be improved as shown in table 5.

Besides the UV-curing, the materials of this invention are crosslinkable by electron beam or in presence of a thermal activated azo- or peroxide initiators or the materials of this invention may also be cured by reaction with compounds having multifunctional donor groups capable of chemical reaction with acryloyl groups, such as for example amines, thioalcohols or multifunctional CH-acidic groups.

This invention will be further explained by a consideration of the following non-limiting examples which are intended to be purely exemplary of this invention.

EXAMPLES

Example 1-15

Into five 200 ml bottles was weighed 83.7 g of ditrimethylopropane tetracetoacetate (acetoacetate functionality=4, acidic C—H functionality=8). A different amount (see table 3, column 4) of the monomeric vinyl compound n-butyl acrylate was added to each bottle. Then, to each bottle was added 1% by weight (based on the total weight) of trioctyl phosphine (TOP) catalyst, the bottles were sealed and then shaken. After the mild exotherm had subsided, they were placed into a 72° C. oil bath for 6 hours. Gas chromatography analysis showed that butyl acrylate was completely consumed and gel permeation chromatography analysis and NMR analysis confirmed that butyl acrylate is attached to the acetoacetate groups. Table 1 shows the characteristics of the five intermediates A-E.

TABLE 1

| No | Weight Di-TMP-$(OAcAC)_4$ | Milli-equivalent | Weight butyl-acrylat | Milli-equivalent C=C | Consumption of C—H Equivalents | Donor functionality | Milliequivalent C—H/g (after |
|---|---|---|---|---|---|---|---|
| A | 83.7 g | 1143 | 64.0 g | 500 | 43.7% | 4.5 | 4.38 |
| B | 83.7 g | 1143 | 73.0 g | 570 | 49.9% | 4.0 | 3.67 |
| C | 83.7 g | 1143 | 81.9 g | 640 | 56.0% | 3.5 | 3.04 |
| D | 83.7 g | 1143 | 90.9 g | 710 | 62.1% | 3.0 | 2.48 |
| E | 83.7 g | 1143 | 99.8 g | 780 | 68.2% | 2.5 | 1.97 |

[1]Consumption of C—H equivalents:
(milliequivalent acryloyl groups)/(milliequivalents acidic C—H 2 O groups in tetraacetoacetate) × 100

[2]The donor functionality was determined by the following equation: Df =
Of − (Of × % by weight consumed C—H functions/100); Df = Donor functionality;
Of = Original functionality (tetraacetoacetate = 4 × 2 C—H groups) = 8

[3]milliequivalent C—H/g = (milliequivalent C—H-functions-milliequivalent acryloyl groups)/(weight Di-TMP-(OAcAC)4 + weight butylacrylate)

About 5 gram of each intermediates (No. A-E) was further reacted at 60° C. with 3 different amounts of dipropyleneglycol diacrylate (DPGDA, Functionality=2), catalyzed by addition of 1% by weight of TOP. Table 2 shows the characteristics of the curable liquid acryloyl group containing resin compositions:

5 grams of each intermediates (No. F-J) was further reacted to 70° C. with 5 different amounts of dipropyleneglycol diacrylate (DPGDA, Functionality=2), catalyzed by addition of 0.4% by weight of powdered potassium hydroxide. The characteristics of the 25 acryloyl group containing resin compositions are depicted in table 4.

TABLE 2

Examples 1-15

| Example | Aceto-acetate No. | Weight Acetoacetate | [1]Milli-equivalent C—H | [2]Donor Functionality | Weight DPGDA | [3]Milli-equivalent C═C | Acceptor Functionality | Equivalent ratio C═C:C—H | Weight % Multifunctional | Viscosity mPas@ 25° C. |
|---|---|---|---|---|---|---|---|---|---|---|
| 1  | A | 5.01 g | 21.94 | 4.5 | 8.26 g  | 68.23  | 2 | 3.10:1 | 62.25 | 21600 |
| 2  | A | 5.00 g | 21.90 | 4.5 | 10.31 g | 85.16  | 2 | 3.88:1 | 67.34 | 5760  |
| 3  | A | 5.00 g | 21.90 | 4.5 | 12.39 g | 102.34 | 2 | 4.67:1 | 71.25 | 2160  |
| 4  | B | 5.16 g | 18.94 | 4.0 | 6.78 g  | 56.00  | 2 | 2.95:1 | 56.78 | 28640 |
| 5  | B | 5.08 g | 18.64 | 4.0 | 8.28 g  | 68.39  | 2 | 3.66:1 | 61.98 | 6880  |
| 6  | B | 5.06 g | 18.57 | 4.0 | 10.10 g | 83.43  | 2 | 4.49:1 | 66.62 | 2560  |
| 7  | C | 5.01 g | 15.23 | 3.5 | 5.33 g  | 44.03  | 2 | 2.89:1 | 51.55 | 17600 |
| 8  | C | 5.09 g | 15.47 | 3.5 | 6.67 g  | 55.09  | 2 | 3.56:1 | 56.72 | 6880  |
| 9  | C | 5.08 g | 15.44 | 3.5 | 8.05 g  | 66.49  | 2 | 4.31:1 | 61.31 | 3040  |
| 10 | D | 5.06 g | 12.55 | 3.0 | 4.07 g  | 33.63  | 2 | 2.68:1 | 44.58 | 21440 |
| 11 | D | 5.00 g | 12.40 | 3.0 | 5.09 g  | 42.04  | 2 | 3.39:1 | 50.45 | 7360  |
| 12 | D | 5.12 g | 12.70 | 3.0 | 6.11 g  | 50.47  | 2 | 3.97:1 | 54.41 | 3840  |
| 13 | E | 5.08 g | 10.01 | 2.5 | 2.96 g  | 24.45  | 2 | 2.44:1 | 36.82 | 33280 |
| 14 | E | 5.11 g | 10.07 | 2.5 | 3.70 g  | 30.56  | 2 | 3.03:1 | 42.00 | 12480 |
| 15 | E | 5.03 g | 9.91  | 2.5 | 4.46 g  | 36.84  | 2 | 3.72:1 | 47.00 | 5280  |

[1]Milliequivalent acetoacetate = (g acetoacetate resin) × (milliequivalent acetoacetate/g) from table 3 column 8
[2]Values from table 3 column 7
[3]Milliequvalent DPGDA = 2 × (g dipropylene glycol diacrylate)/0.2425
[4]Equivalent ratio = (milliequivalent acidic C—H)/(milliequivalent acrylate)
[5]% by weight multifunctional acrylate = g DPGDA/(g DPGDA + g acetoacetate) ×100

Examples 16-30

An acetoacetylated alkyd resin was prepared after the following procedure: A mixture of 148.0 g of phthalic anhydride, 119.0 g of 2-methyl-1,3-propandiol, 88.0 g of trimethylol propane and 1.5 g of dibutyltinoxide was stirred at 200-220° C. until 18 g of water was collected. Then, the temperature was lowered to 140° C. and 116.0 g of methyl acetoacetate was added. Then, the temperature was gradually increased to 160° C. and maintained until no more methanol was formed. Then, light vacuum was applied to remove small amounts of unreacted methyl acetoacetate. The acetoacetate base resin showed a viscosity of 8800 mPas @25° C. and an acetoacetate equivalent of 2.37 mmol/g (4.74 mequivalent C—H/g).

Into five 100 ml bottles was weighed each 30.0 g of the acetoacetate resin. A different amount of the monomeric vinyl component n-butyl acrylate (see table 3, column 3) was added to each bottle. Then, to each bottle was added 0.4% by weight (based on the total weight) of potassium hydroxide (KOH), the bottles were sealed, shaken and placed into an 80° C. oil bath for 6 hours. Gaschromatography analysis showed that butyl acrylate was completely consumed. Table 5 shows the characteristics of the five intermediates F-J.

TABLE 3

| No | Weight Acetoacetate | Height Butylacryla | Mequivalent C—H | Total Weight | Mequivalent C—H/g | Viscosity mPas @ 25° C. |
|---|---|---|---|---|---|---|
| F | 30.0 g | 5.46 g  | 99.54 | 35.46 g | 2.81 | 2200 |
| j | 30.0 g | 7.27 g  | 85.32 | 37.27 g | 2.29 | 2200 |
| H | 30.0 g | 9.08 g  | 71.10 | 39.08 g | 1.82 | 2400 |
| 1 | 30.0 g | 10.88 g | 56.88 | 40.88 g | 1.39 | 2400 |
| J | 30.0 g | 12.80 g | 42.66 | 42.80 g | 1.00 | 2500 |

TABLE 4

Examples 16-30 of acryloyl group containing resin compositions based on alkyd resins

| Example No. | Acetoacetate No from table 3 | Weight Acetoacetate | Weight DPGDA | % by weight of Multifunctio | Reaction product |
|---|---|---|---|---|---|
| 16 | F | 5.0 g | 6.79 g  | 57.6 | Liquid |
| 17 | F | 5.0 g | 8.49 g  | 62.9 | Liquid |
| 18 | F | 5.0 g | 10.19 g | 67.1 | Liquid |
| 19 | G | 5.0 g | 5.54 g  | 52.6 | Liquid |
| 20 | G | 5.0 g | 6.93 g  | 58.1 | Liquid |
| 21 | G | 5.0 g | 8.31 g  | 62.4 | Liquid |
| 22 | H | 5.0 g | 4.40 g  | 46.8 | Liquid |
| 23 | H | 5.0 g | 5.51 g  | 52.4 | Liquid |
| 24 | H | 5.0 g | 6.61 g  | 56.9 | Liquid |
| 25 | I | 5.0 g | 3.37 g  | 40.3 | Liquid |
| 26 | I | 5.0 g | 4.21 g  | 45.8 | Liquid |
| 27 | I | 5.0 g | 5.05 g  | 50.2 | Liquid |
| 28 | J | 5.0 g | 2.418   | 32.5 | Liquid |
| 29 | J | 5.0 g | 3.01 g  | 37.5 | Liquid |
| 30 | J | 5.0 g | 3.62 g  | 42.0 | Liquid |

Example 31

700 g of gum rosin (colophony, acid value: 165 mg KOH/g, softening point: 70° C.) was stirred under nitrogen for 90 minutes at a temperature of 180° C. Then, 64.0 g of maleic anhydride was added. The temperature was maintained at 180° C. for 15 minutes, then raised to 215° C. and stirred at that temperature for 1 hour. A test with N,N-dimethyl aniline showed that at that point the reaction mixture contains no more free maleic anhydride. Then, a mixture of 155.0 g of pentaerythritol and 0.60 g of magnesium oxide was added in small portions. After the addition was complete, the temperature was raised to 265 to 270° C. The reaction mixture was stirred and the temperature was maintained until the acid value decreased to 10 mg KOH/g. The temperature was lowered to 140° C. and product was neutralized with a small amount of potassium hydroxide until the acid value dropped below 2 mg KOH/g and 116.0 g of methyl acetoacetate was added. The temperature was gradually increased to 166° C. and maintained until no more methanol was formed by transesterification and collected by distillation. 100 g of the amber colored acetoacetylated product was mixed with 10 g of butyl acrylate and treated with 2.0 g of diazabicycloundecene at 90° C. for 3 hours, followed by the addition of 90.0 g of dipropylene glycol diacrylate. The mixture was stirred for another 6 hours at 80° C., yielding an amber colored acrylated maleic modified rosin ester, dissolved in dipropylene glycol diacrylate. Acrylate equivalent: 3.5 mmol/g.

Example 32

20.0 g of butyl acrylate, 60.0 g methyl methacrylate and 20.0 g of 2-acetoacetoxyethyl methacrylate was dissolved in 100 g of toluene and copolymerized at 90° C. in presence of 1.5 g of azobisisobutyronitrile (AIBN). To the polymer solution a mixture of 5.0 g of methyl vinyl ketone and 10.0 g of butyl acrylate was added followed by 1.5 g of diazabicycloundecene (DBU). The mixture was warmed to 50° C. for 8 hours. Gaschromatography showed the complete reaction of butyl acrylate and methyl vinyl ketone. Then, toluene was removed by evaporation under reduced pressure (50 mbar). Viscosity: 5200 mPas @25° C. 10 g of the resin was diluted with 9.0 g of 1,6-hexanadiol diacrylate and stirred at 60° C. for 4 hours. Then, 0.25 g of 2-hydroxy-2-methylpropiophenone (Darcure 1173) was dissolved in the mixture. The coating was applied on top of an aluminum test panel in a film thickness of 50 um and cured at a belt speed of 16 m/minute with a Fusion H bulb. Solvent resistance: >50 MEK double-rubs.

Example 33

5.0 g of the acetoacetate resin base used for examples 16-30 (2.37 mmole acetoacetate/g, viscosity: 8800 mPas @25° C.) was mixed with 1.0 g of butyl acrylate and 6.0 g of tripropylene glycol diacrylate. The solution was warmed to 80° C. and treated with 0.1 g of powdered potassium hydroxide. The mixture was stirred at 80° C. for 6 hours yielding an acryloyl group containing resin having a viscosity of 6200 mPas @25° C.

Example 34

2.0 g of acetyl acetone, 0.70 g of butyl acrylate and 4.0 g of trimethylol propane triacrylate and 3.0 g of dipropylene glycol diacrylate were mixed and treated with 0.10 g of diazabicyloundecene (DBU). After the exothem has subsided, the mixture was stirred at 80° C. for 3 hours. The product shows a viscosity of 5.2 Pas at 25° C. and a molecular weight of Mw=2100.

Example 35

0.70 g of acrylonitrile and 4.0 g of trimethylol propane triacrylate and 3.0 g of dipropylene glycol diacrylate and were mixed and treated with 0.10 g of diazabicyloundecene (DBU). Then, 2.0 g of acetyl acetone was added dropwise. After addition was complete, the mixture was stirred at 50° C. for 8 hours. The product shows a viscosity of 6.2 Pas at 25° C. and a molecular weight of Mw=2300.

Example 36

2.0 g of diethyl malonate, 0.70 g of butyl acrylate and 4.0 g of trimethylol propane triacrylate and 3.0 g of dipropylene glycol diacrylate were mixed and treated with 0.10 g of diazabicyloundecene (DBU). After the exothem has subsided, the mixture was stirred at 80° C. for 3 hours. The product shows a viscosity of 6.7 Pas at 25° C. is and a molecular weight of Mw=2200.

Example 37 to 42

Five coatings were made by dilution of compositions of examples 1, 4, 7, 10 and 13 with dipropyleneglycol diacrylate (DPGDA), followed by addition of 3% by weight Darocure 1173 photoinitiator (coating viscosity: 360-400 mPas). These coatings were drawn down on aluminum test panels in a thickness of 50 um (wet) and cured together with the control coating (No. 6) by 1 pass under a 300 W/inch Fusion "D" bulb. The results are reported in table 5.

TABLE 5

|  | Coating | Composition of example | Milliequivalent C=C | Coating viscosity | UVDose[3] J/cm$^2$ | MEK2x rubs[4] | Pencil Hardness |
|---|---|---|---|---|---|---|---|
| Example 37 | 1 | 1 | 3.48 | 380 mPas | 180 | >100 | 2H |
| Example 38 | 2 | 4 | 3.10 | 390 mPas | 180 | >100 | 2H |
| Example 39 | 3 | 7 | 2.76 | 360 mPas | 180 | >100 | 2H |
| Example 40 | 4 | 10 | 2.31 | 380 mPas | 180 | >100 | 2H |

TABLE 5-continued

| Coating | Composition of example | Milliequivalent C=C | Coating viscosity | UVDose[3] J/cm$^2$ | MEK2x rubs[4] | Pencil Hardness |
|---|---|---|---|---|---|---|
| Example 41 | 5 | 13 | 1.79 | 360 mPas | 180 | >100 | 2H |
| Example 42 | 6 | Control | 4.79 | 400 mPas | 180 | >100 | 2H |

[1]The acrylate equivalents of the acrylated resin compositions (example 1, 4, 7, 10, 13 and control) were measured by the morpholine method (Organic Functional Group Analysis, F. E. Critchfield (Ed.) Pergamon Press, Oxford 1963, page 116). The acryloyl groups are reacted with an excess of the secondary amine morpholine. The remaining excess of free morpholine is acetylated by acetic anhydride. Then, the tertiary amine, which was formed by the reaction of acryloyl group and morpholine is titrated with perchloric acid.
[2]Coating viscosity, measured with an ICI cone and plate viscosimeter at a shear rate of 5000 D$^{-1}$
[3]Radiant energy of the UV-bulb (total UVA-C) at the surface of the coating measures with the radiometer UVICURE from EIT company
[4]Solvent resistance of the hardened film, tested by repeated rubbing of the film surface with a woodpulp cloth impregnated with methyl ethyl ketone (MEK). The number of rubbings that did not produce any visible damage to the coating was measured.
[5]Lead pencil hardness after cure, at which the film exhibits the first visible signs of damage.
[6]Control resin: prepared in the same way as compositions 1, 4, 7, 10, 13 from dipropylene glycol diacrylate and di-trimethylolpropane tetraacetoacetate but without butyl acrylate.

As previously mentioned, an unexpected observation was that the resin compositions of this invention which had lower acrylate (C=C) equivalents compared to the control composition, made without monofunctional vinyl compounds, did not differ in cured properties that are related to acrylate equivalents.

Example 43 to 48

Adhesion test was carried out complying with ASTM D3359 for assessing the adhesion of, cured coating films which was formed with the compositions from examples 1, 4, 7, 10, 13 to metallic substrates by applying and removing pressure-sensitive tape over cuts made in the film.

In the test method, an "X-cut" was made in the film to the substrate, pressure-sensitive tape was applied over the cut and then removed, and adhesion was assessed qualitatively on a 0 to 5 scale, showing which percentage of polymer coating had been removed by the tape.

Table 6 shows that acrylated resin compositions from examples 1, 4, 7, 10, 13 exhibit an improved adhesion on aluminum after UV-curing (test result=2-3), which means 5-35% by weight of the affected coating area was removed by the tape, compared to the control composition, which shows practically no adhesion on aluminum (test result=0) and more than 65% by weight of the affected coating area was removed by the tape.

TABLE 6

Measured according ASTM 3359

| Coating | Composition of example | MilliequivalentC=C | Coatingviscosity | UV-DosemJ/cm$^2$ | Classification | Aeraremoved (% by weight) |
|---|---|---|---|---|---|---|
| Example 1 | 1 | 3.48 | 380 mPas | 400 | 2 | 15-35% |
| Example 2 | 4 | 3.10 | 390 mPas | 400 | 2 | 15-35% |
| Example 3 | 7 | 2.76 | 360 mPas | 400 | 2 | 15-35% |
| Example 4 | 10 | 2.31 | 380 mPas | 400 | 2 | 15-35% |
| Example 5 | 13 | 1.79 | 360 mPas | 400 | 3 | 5-15% |
| Example 6 | Control | 4.79 | 400 mPas | 400 | 0 | >65% |

INDUSTRIAL APPLICABILITY

The curable liquid acryloyl group containing resin composition produced according to the described methods is suitable for producing hardenable or curable coatings, printing inks, adhesives, sheets and moulding compositions.

The invention claimed is:

1. An acryloyl group containing resin composition Michael addition reaction product of
 (a) at least one Michael addition acceptor compound having only one vinyl group selected from acrylic esters (acrylates), alkyl vinyl ketones, acrolein, acrylonitrile, acrylamides or vinylsulfonates, and
 (b) at least one multifunctional acrylic ester, with
 (c) at least one β-dicarbonyl group containing compound or resin, in which the β-dicarbonyl group has two activated hydrogen atoms in its methylene position,
 wherein the equivalent ratio of the vinyl group of the vinyl compound (a) to the activated hydrogen atom of the compound or resin (c) is in the range from 0.01:1 to 0.9:1 and
 the equivalent ratio of all unsaturated groups from both vinyl compound (a) and multifunctional acrylic ester (b) to the activated hydrogen atom of the compound or resin (c) is >1.05:1, and
 wherein the resin composition is a curable liquid.

2. The composition according to claim 1, characterized in that component (c) is selected from the group consisting of acetoacetates, β-diketones or malonates.

3. The composition of claim 1, characterized in that the vinyl compound does not have any additional functional group having atoms other than carbon and hydrogen.

4. The composition according to claim 1, characterized in that the vinyl compound is selected from the group consisting of 2-hydroxyethyl acrylate, 2-hydroxypropyl acrylate, 2-hydroxybutyl acrylate, 3-hydroxybutyl acrylate, 4-hydroxybutyl acrylate, 6-hydroxyhexyl acrylate, N-alkoxymethyl acrylamide, N-acryloyl morpholine, glycidyl acrylate, 2-isocyanatoethyl acrylate, poly(ethylene glycol)monoacrylate, polypropylene glycol)monoacrylate, perfluoroalkyl acrylate and poly(dimethylsiloxane)monoacrylate.

5. A process for the preparation of the curable liquid acryloyl group containing resin composition as claimed in claim 1, comprising the step of Michael addition reacting (a) at least one Michael addition acceptor compound having only one vinyl group, and
(b) at least one multifunctional acrylic ester with
(c) at least one β-dicarbonyl group containing compound or resin, in which the β-dicarbonyl group has two activated hydrogen atoms in its methylene position,
such that the equivalent ratio of the vinyl group of the vinyl compound (a) to the activated hydrogen atom of the compound or resin (c) is in the range from 0.01:1 to 0.9:1 and
the equivalent ratio of all unsaturated groups from both the vinyl compound (a) and the multifunctional acrylic ester (b) to the activated hydrogen atom of the compound or resin (c) is >1.05:1.

6. A process for the preparation of the curable liquid acryloyl group containing resin composition as claimed in claim 1, comprising the steps of
(1) Michael addition reacting
(a) at least one Michael addition acceptor compound having only one vinyl group, with
(c) at least one β-dicarbonyl group containing compound or resin, in which the β-dicarbonyl group has two activated hydrogen atoms in its methylene position,
to yield a mono-substituted β-dicarbonyl group containing compound or resin, in which the mono-substituted β-dicarbonyl group has only one activated hydrogen atom in its methylene position, and
(2) reacting said mono-substituted β-dicarbonyl group containing compound or resin with
(b) multifunctional acrylic ester.

7. The process according to claim 6, wherein the equivalent ratio of the vinyl group of the vinyl compound (a) to the activated hydrogen atom of the compound or resin (c) is in the range from 0.01:1 to 0.9:1 in the step (1), and the equivalent ratio of vinyl group of the multifunctional acrylic ester (b) to the activated hydrogen atom of the mono-substituted β-dicarbonyl group containing compound or resin is >1.05:1 in the step (2).

8. A process according to claim 5, wherein the vinyl compound (a) does not have any additional functional group other than vinyl group.

9. A process according to claim 6, wherein the vinyl compound (a) does not have any additional functional group other than the vinyl group.

10. The process according to claim 6, wherein the process is carried out in the presence of a Michael addition catalyst.

11. The process according to claim 5, wherein the process is carried out in the presence of a Michael addition catalyst.

12. A curing method, comprising the step of curing a curable liquid acryloyl group containing resin composition according to claim 1 by ultraviolet light or electron beam or heat.

13. The curing method according to claim 12, wherein the curing step is carried out in the absence of a photoinitiator.

14. A cured product obtained by the curing method according to claim 13.

15. A cured product obtained by the curing method according to claim 12.

16. A curing method, comprising the step of curing a curable liquid acryloyl group containing resin composition according to claim 1 by ultraviolet light or electron beam or heat.

17. The curing method according to claim 16, wherein the curing step is carried out in the absence of a photoinitiator.

18. A cured product obtained by the curing method according to claim 17.

19. A cured product obtained by the curing method according to claim 16.

20. A curing method, comprising the step of curing a curable liquid acryloyl group containing resin composition according to claim 2 by ultraviolet light or electron beam or heat.

21. The curing method according to claim 20, wherein the curing step is carried out in the absence of a photoinitiator.

22. A cured product obtained by the curing method according to claim 21.

23. A cured product obtained by the curing method according to claim 20.

24. A curing method, comprising the step of curing a curable liquid acryloyl group containing resin composition according to claim 3 by ultraviolet light or electron beam or heat.

25. The curing method according to claim 24, wherein the curing step is carried out in the absence of a photoinitiator.

26. A cured product obtained by the curing method according to claim 25.

27. A cured product obtained by the curing method according to claim 24.

28. A curing method, comprising the step of curing a curable liquid acryloyl group containing resin composition according to claim 4 by ultraviolet light or electron beam or heat.

29. The curing method according to claim 28, wherein the curing step is carried out in the absence of a photoinitiator.

30. A cured product obtained by the curing method according to claim 29.

31. A cured product obtained by the curing method according to claim 28.

32. The composition according to claim 1, characterized in that component (c) is selected from the group consisting of acetoacetates, β-diketones or malonates.

* * * * *